US007117729B2

(12) United States Patent
Hosoya et al.

(10) Patent No.: US 7,117,729 B2
(45) Date of Patent: Oct. 10, 2006

(54) DIAGNOSIS APPARATUS FOR FUEL VAPOR PURGE SYSTEM AND METHOD THEREOF

(75) Inventors: Hajime Hosoya, Isesaki (JP); Satoru Watanabe, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 42 days.

(21) Appl. No.: 10/963,804

(22) Filed: Oct. 14, 2004

(65) Prior Publication Data

US 2005/0081612 A1 Apr. 21, 2005

(30) Foreign Application Priority Data

Oct. 16, 2003 (JP) ............................ 2003-356893

(51) Int. Cl.
*G01M 15/00* (2006.01)

(52) U.S. Cl. ...................................... 73/118.1; 73/49.7

(58) Field of Classification Search .................... 73/40, 73/46, 47, 49.7, 116, 117.2, 117.3, 118.1, 73/119 R
See application file for complete search history.

(56) References Cited

U.S. PATENT DOCUMENTS 6,389,882 B1 * 5/2002 Ohkuma ..................... 73/49.7
6,832,509 B1 * 12/2004 Morinaga et al. .......... 73/118.1
6,854,321 B1 * 2/2005 Amlin ........................ 73/49.7
6,935,162 B1 * 8/2005 Oki et al. .................... 73/49.2
6,945,093 B1 * 9/2005 Amano et al. ............... 73/49.7
2004/0060343 A1 * 4/2004 Amano et al. ............... 73/49.7
2005/0217348 A1 * 10/2005 Amano et al. ............... 73/49.7

FOREIGN PATENT DOCUMENTS

JP 2001-082261 A 3/2001

* cited by examiner

*Primary Examiner*—Eric S. McCall
(74) *Attorney, Agent, or Firm*—Foley & Lardner LLP

(57) ABSTRACT

In a fuel vapor purge system, a diagnosis section inclusive of a fuel tank is pressurized from the generation of fuel vapor in the fuel tank has been finished after an operation of an engine was stopped, and the diagnosis is performed based on a pressure in the diagnosis section.

19 Claims, 4 Drawing Sheets

DIAGNOSIS APPARATUS FOR FUEL VAPOR PURGE SYSTEM AND METHOD THEREOF

FIELD OF THE INVENTION

The present invention relates to an apparatus and a method for diagnosing whether or not the leakage occurs in a diagnosis section inclusive of a fuel tank, in a fuel vapor purge system.

RELATED ART

Japanese Unexamined Patent Publication No. 2001-082261 discloses a diagnosis apparatus for a fuel vapor purge system.

In this diagnosis apparatus, a pressure change in a fuel tank within a fixed time after an operation of an internal combustion engine has been stopped is detected, and it is diagnosed whether or not the leakage occurs, based on the pressure change.

Immediately after the operation of the internal combustion engine has been stopped, a fuel temperature is high and therefore, fuel (gasoline) is evaporated positively.

Then, in a state where the fuel is evaporated positively, the pressure in the fuel tank is changed due to the fuel evaporation.

Therefore, during a period immediately after the operation the internal combustion engine has been stopped, where the fuel is evaporated positively, sometimes, an occurrence of leakage is erroneously diagnosed.

SUMMARY OF THE INVENTION

The present invention has an object to perform the leakage diagnosis with high accuracy, without an influence of fuel evaporation immediately after an operation of an internal combustion engine has been stopped.

In order to achieve the above object, according to a diagnosis apparatus and a diagnosis method of the present invention, the diagnosis processing is started from a standby time has elapsed after an operation of an internal combustion engine was stopped.

The other objects and features of this invention will become understood from the following description with reference to the accompanying drawings.

DESCRIPTION OF EMBODIMENTS

Figure 1:
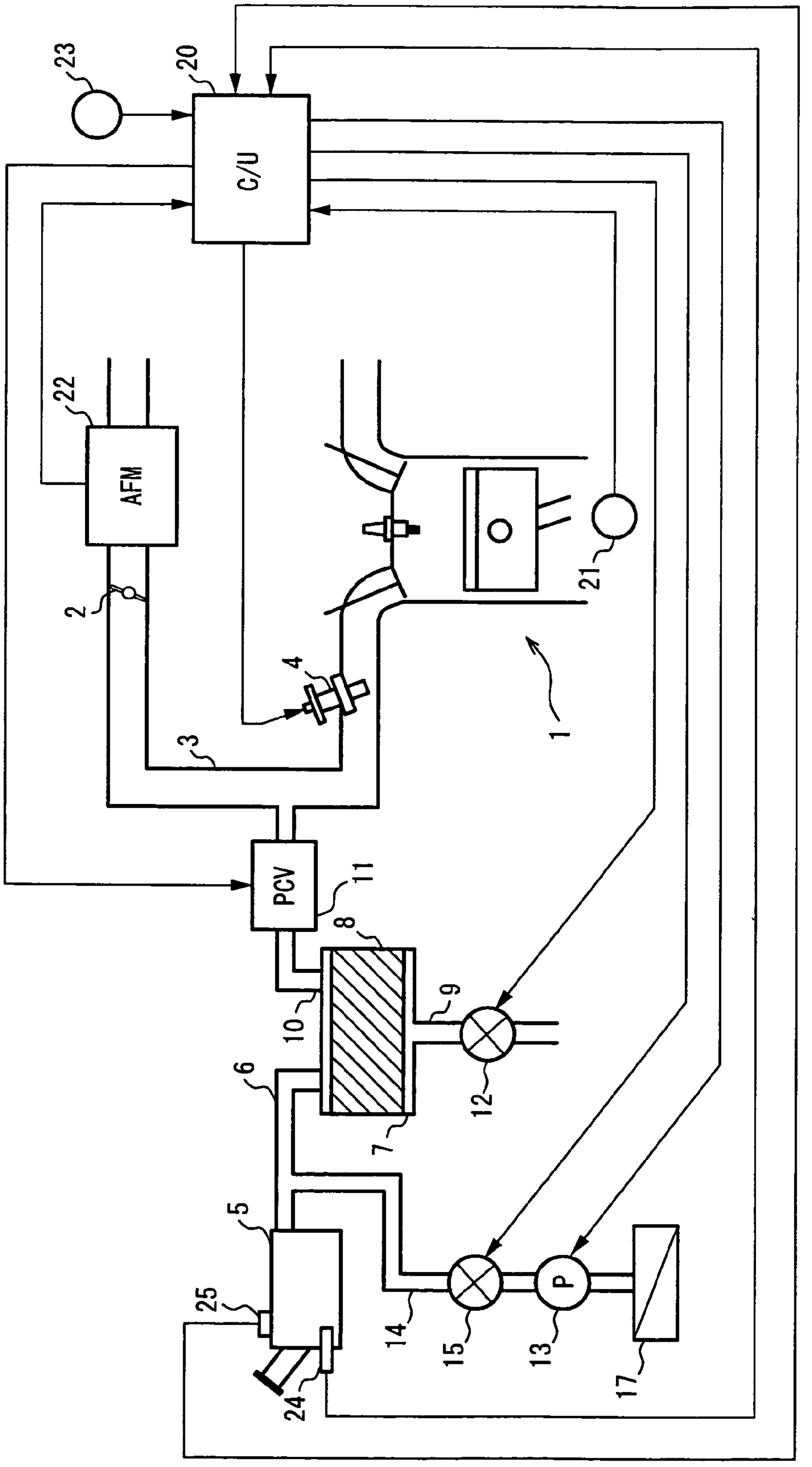
FIG. 1 is a diagram showing a system configuration of an internal combustion engine in an embodiment.

FIG. 1 shows a system configuration of an internal combustion engine in an embodiment.

In FIG. 1, an internal combustion engine 1 is a gasoline engine installed in a vehicle (not shown in the figure).

A throttle valve 2 is disposed in an intake pipe 3 of internal combustion engine 1.

For each cylinder, a fuel injection valve 4 is disposed in intake pipe 3 on the downstream side of throttle valve 2.

Fuel injection valve 4 is opened based on an injection pulse signal output from a control unit 20.

Further, internal combustion engine 1 is provided with a fuel vapor purge system.

The fuel vapor purge system is for adsorbing the fuel vapor generated in a fuel tank 5 to a canister 7 via an evaporation passage 6, and for purging the fuel vapor adsorbed to canister 7 to supply it to internal combustion engine 1.

Canister 7 is a container filled with the adsorbent 8 such as activated carbon.

Further, a new air inlet 9 is formed to canister 7, and a purge passage 10 is led out from canister 7.

Purge passage 10 is connected to intake pipe 3 on the downstream side of throttle valve 2 via a purge control valve 11.

Purge control valve 11 is opened based on a purge control signal output from control unit 20.

When a purge permission condition is established during an operation of internal combustion engine 1, purge control valve 11 is controlled to open.

When purge control valve 11 is controlled to open, an intake negative pressure of internal combustion engine 1 acts on canister 7, So that the fuel vapor adsorbed to canister 7 is detached by the fresh air, which is introduced through new air inlet 9.

Purged gas inclusive of the detached fuel vapor passes through purge passage 10 to be sucked into intake pipe 3.

Control unit 20 incorporates therein a microcomputer comprising a CPU, a ROM, a RAM, an A/D converter and an input/output interface.

Control unit 20 receives detection signals from various sensors, to perform various controls by the calculation processing based on these signals.

As the various sensors, there are provided a crank angle sensor 21 detecting a crank angle, an air flow meter 22 measuring an intake air flow amount of internal combustion engine 1, a vehicle speed sensor 23 detecting a vehicle speed, a pressure sensor 24 detecting a pressure in fuel tank 5, and a fuel level sensor 25 detecting a fuel level in fuel tank 5.

Here, control unit 20 performs the leakage diagnosis in the fuel vapor purge system after an operation of internal combustion engine 1 has been stopped.

For performing the leakage diagnosis, a drain cut valve 12 for opening/closing new air inlet 9 is disposed and also an air pump 13 for sending air into evaporation passage 6 is disposed.

A discharge port of air pump 13 is connected to evaporation passage 6 via an air supply pipe 14.

A check valve 15 is disposed in the halfway of air supply pipe 14.

Further, an air cleaner 17 is disposed on the inlet port side of air pump 13.

Control unit 20 starts the leakage diagnosis from a standby time has elapsed after the engine operation was stopped.

In the leakage diagnosis, at first, purge control valve 11 and drain cut valve 12 are controlled to close, so that a diagnosis section inclusive of fuel tank 5, evaporation passage 6, canister 7 and purge passage 10 on the upstream of purge control valve 11, is shielded.

Next, control unit 20 supplies the air to the diagnosis section by air pump 13, to pressurize the diagnosis section.

Then, it is diagnosed whether or not the leakage occurs in the diagnosis section, based on the pressure in fuel tank 5 or a load of air pump 13 at the pressurization time.

Note, it is possible to diagnose whether or not the leakage occurs, based on the pressure leakage after the diagnosis section has been pressurized.

Further, it is also possible to depressurize the diagnosis section by air pump 13, to thereby diagnose whether or not the leakage occurs, based on a pressure change at the time.

Figure 2:
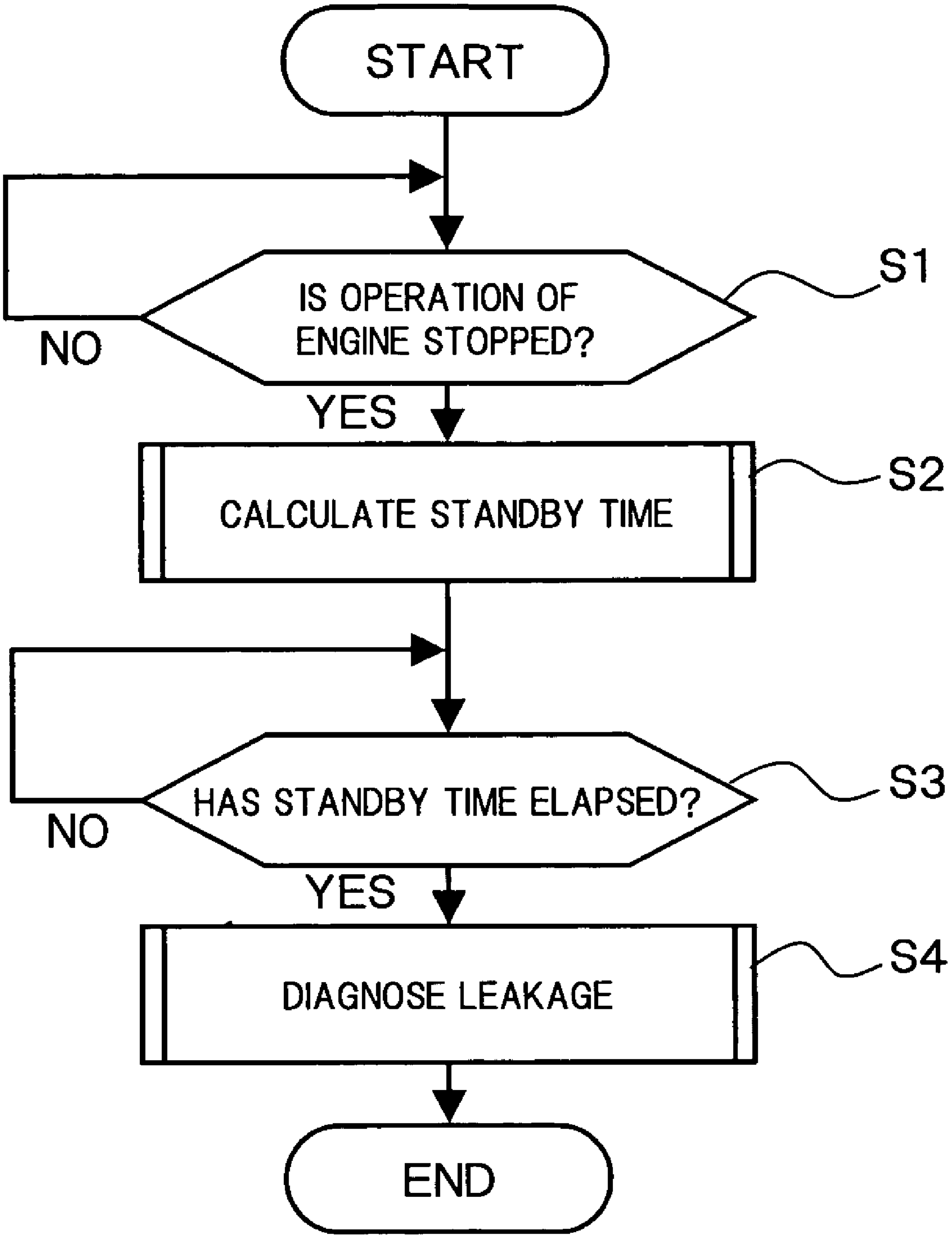
FIG. 2 is a flowchart showing the leakage diagnosis in a first embodiment.

A flowchart of FIG. 2 shows a first embodiment of the leakage diagnosis by control unit 20.

In step S1, it is judged whether or not the operation of internal combustion engine 1 has been stopped.

Then, if the operation of internal combustion engine 1 has been stopped, control proceeds to step S2.

The operation stop of internal combustion engine 1 is judged by detecting timing at which an ignition key of the vehicle is turned from ON to OFF, or judging the rotation stop of internal combustion engine 1 based on a signal from the crank angle sensor 21.

In step S2, the calculation of the standby time until the start of leakage diagnosis after the operation of internal combustion engine 1 has been stopped.

The standby time is calculated as any one of the followings (1) to (16).

(1) A previously stored fixed time;

(2) A time set according to a fuel state (temperature and/or fuel property) at the operation stop time or during the operation of the internal combustion engine;

(3) A time set according to engine operating conditions (engine rotation speed, engine load and the like) at the operation stop time or during the operation of the internal combustion engine;

(4) A time set according to the swing, vibration, acceleration of the vehicle during the operation of the internal combustion engine;

(5) A time set according to the ambient air temperature at the operation stop time or during the operation of the internal combustion engine;

(6) A time set according to the atmospheric pressure or a change in the atmospheric pressure at the operation stop time or during the operation of the internal combustion engine;

(7) A time set according to the altitude at the operation stop time or during the operation of the internal combustion engine;

(8) A time set according to a temperature of each part (engine room or the like) of the vehicle at the operation stop time or during the operation of the internal combustion engine;

(9) A time set according to the fuel level in the fuel tank at the operation stop time or during the operation of the internal combustion engine;

(10) A fixed time set according to the volume and shape of the fuel tank;

(11) A time set according to the pressure in the fuel tank or in an evaporation purge line at the operation stop time or immediately after the operation stop of the internal combustion engine;

(12) A time set according to the operation number or the operation frequency of a radiator fun during the operation of the internal combustion engine;

(13) A time set according to an integral value, an average value, the standard deviation and the like of an engine intake air amount, the throttle opening or the accelerator opening during the operation of the internal combustion engine;

(14) A time set according to an operation state of a thermostat during the operation of the internal combustion engine;

(15) A time set according to a running distance, a running time and the vehicle speed during the operation of the internal combustion engine; and

(16) A time set according to the engine operating conditions (engine load, engine rotation speed and the like) during a fixed period immediately before the operation stop of the internal combustion engine.

In the above (1) to (16), (5) to (7) are for calculating the standby time based on environmental conditions of the internal combustion engine, in which the standby time is made to be longer under a condition where the fuel is easy to be evaporated.

Further, (3), (4), (8), and (12) to (16) are for calculating the standby time based on data correlating to the fuel temperature, in which the standby time is calculated by estimating the fuel temperature.

Then, as the detection result of the fuel temperature or the estimation result of the fuel temperature is higher, the standby time is made to be longer, The swing, vibration, acceleration of the vehicle in (4), the engine intake air amount, the throttle opening or the accelerator opening in (13), and the running distance and the running time in (15) are data correlating to the engine temperature, and therefore, the fuel temperature can be estimated based on these data.

Further, all of the operation number or the operation frequency of the radiator fun in (12), and the operation state (operation number, operation frequency, operation time or the like) of the thermostat in (14) are data correlating to a cooling water temperature, and therefore, the fuel temperature can be estimated based on these data.

Moreover, if the operating conditions of the internal combustion engine are judged only during the fixed period immediately before the operation stop of the internal combustion engine as shown in (16), it becomes possible to estimate with high accuracy the temperature condition at the time when the internal combustion engine is stopped.

On the other hand, in the setting of the standby time according to the fuel level in (9), the standby time is made to be longer as the fuel level is higher.

In the setting of the standby time according to the volume and shape of the fuel tank in (10), the standby time is set in consideration of the easiness of fuel evaporation according to the volume and shape, and the like.

In the setting of the standby time according to the pressure in the fuel tank or in the evaporation purge line in (11), the standby time is made to be longer as the pressure is higher or the rising speed of the pressure immediately after the engine stop is higher.

The fuel property in (2) is the volatility, and therefore, the standby time is made to be longer as the fuel temperature Is higher or the volatility is higher.

Note, the constitution may be such that the parameters shown in the above (2) to (16) are combined in plural numbers, to set the standby time.

If the standby time is calculated in step S2, control proceeds to next step S3.

In step S3, it is judged whether or not the standby time calculated in step S2 has elapsed.

Then, if it is judged that the calculated standby time has elapsed after the stop of the internal combustion engine, control proceeds to step S4.

Figure 3:
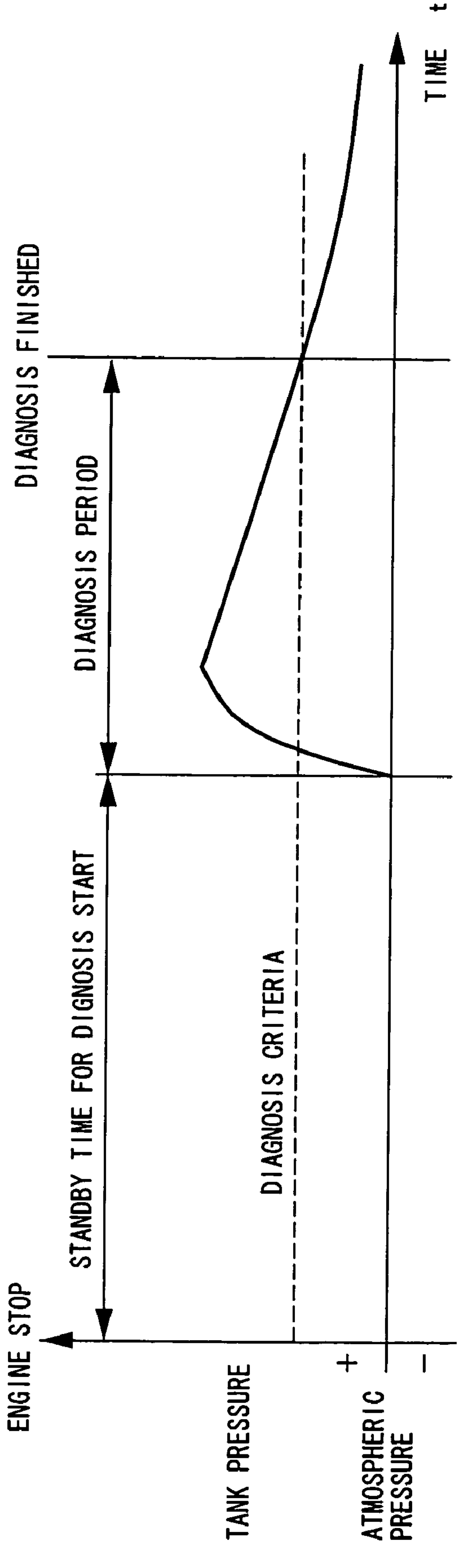
FIG. 3 is a time chart showing a pressure change during the leakage diagnosis in the first embodiment.

In step S4, the diagnosis section is pressurized or depressurized by air pump 13, and it is diagnosed whether or not the leakage occurs, based on the pressure in fuel tank 5 or the load of air pump 13 at the time (refer to FIG. 3).

Thus, if the leakage diagnosis is performed from the standby time has elapsed after the stop of internal combustion engine 1, it is possible to avoid that the leakage diagnosis is performed under a condition where the fuel is positively evaporated, thereby enabling the improvement of accuracy in the leakage diagnosis based on the pressure in fuel tank 5 or the load of air pump 13.

In particular, if the standby time is not set to the fixed value but is calculated based on the fuel temperature, the fuel property, the fuel level and the environmental conditions, it is possible to make the standby time to be shorter utmost, while avoiding that the leakage diagnosis is performed under the condition where the fuel is positively evaporated.

Note, during a period until the standby time has elapsed, control unit 20 does not need to be kept in a normal operating state.

Therefore, during the standby time, it is possible to switch control unit 20 to a low power consumption mode to lower the power consumption.

Further, it is also possible that, during the standby time, the operation of control unit 20 is stopped and also a timer for measuring the standby time is operated, so that control unit 20 is reactivated at the time when the lapse of the standby time is measured by the timer.

Figure 4:
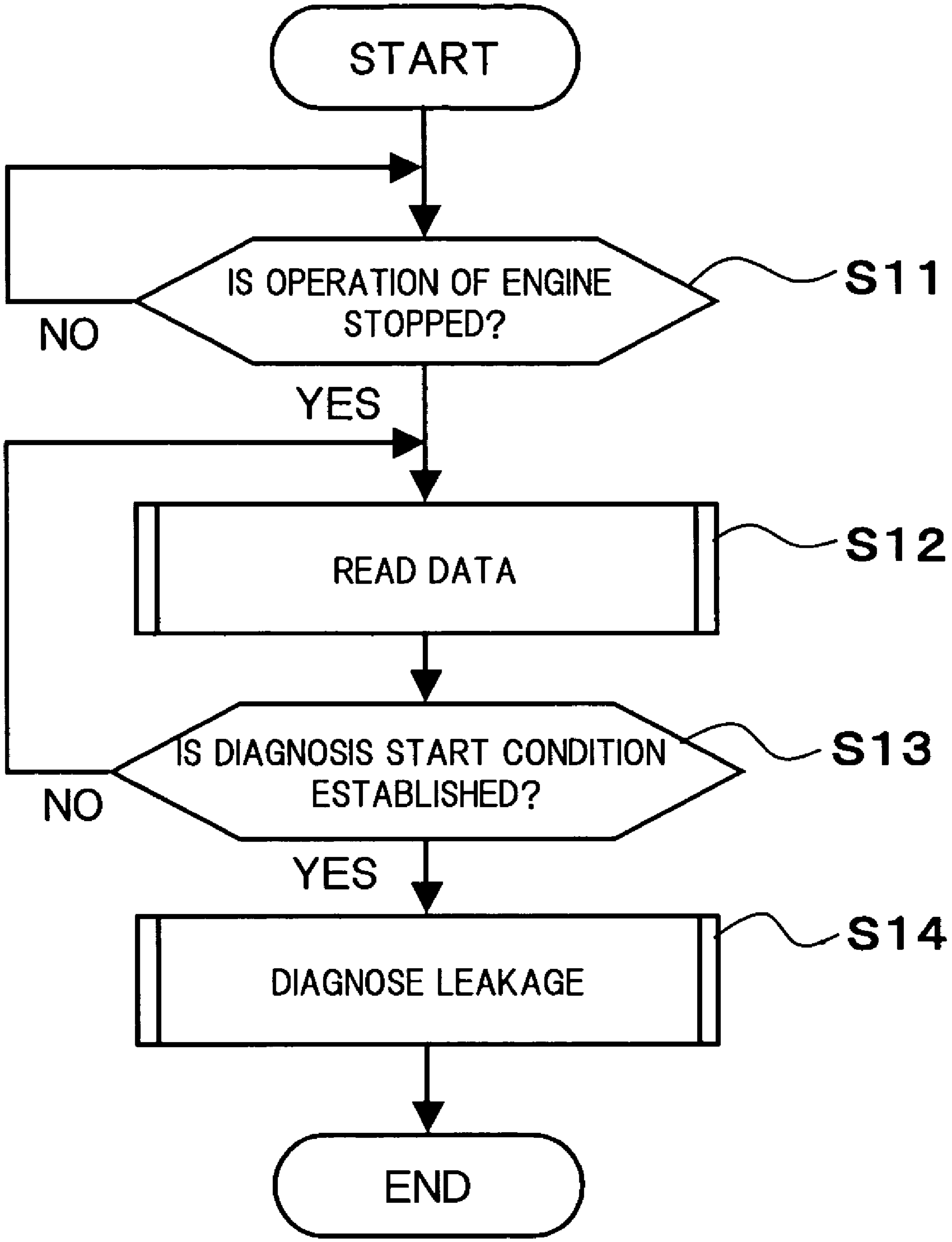
FIG. 4 is a flowchart showing the leakage diagnosis in a second embodiment.

A flowchart of FIG. 4 shows a second embodiment of the leakage diagnosis by control unit 20.

In step S11, it is judged whether or not the operation of internal combustion engine 1 has been stopped. If internal combustion engine 1 has been stopped, control proceeds to step S12.

In step S12, detection data to be used for the judgment of leakage diagnosis start is read.

As the detection data, any one of the followings is used.

(1) The oil temperature, cooling water temperature and temperature of each part of the internal combustion engine
(2) The temperature of each part of the vehicle
(3) The fuel temperature
(4) The ambient air temperature
(5) The pressure in the fuel tank or in the evaporation purge line In step S13, each detection data read in step S12 is compared with a threshold, to judge whether or not the fuel evaporation is substantially finished.

To be specific, when each temperature condition of (1) to (4) becomes lower than a reference temperature or when a pressure condition of (5) becomes lower than a predetermined pressure, it is judged that the fuel evaporation is substantially finished and a diagnosis start condition is established.

Then, until it is judged that the diagnosis start condition is established, the reading of detection data in step S12 and the judgment in step 813 are repetitively executed.

If it is judged in step S13 that the diagnosis start condition is established, control proceeds to step S14.

In step S14, the diagnosis section is pressurized or depressurized by air pump 13, and the leakage diagnosis is performed based on the pressure in fuel tank 5 or the load of air pump 13 at the time.

According to the above constitution, it is detected that the fuel evaporation is finished, by sequentially monitoring a change in the temperature or in the pressure. Therefore, it is possible to avoid with high accuracy that the leakage diagnosis is performed under the condition where the fuel is evaporated positively, and also it is possible to prevent an unnecessary long standby time.

Note, it is possible to combine the start control of the leakage diagnosis based on the standby time calculated at the operation stop time of the internal combustion engine in the first embodiment with the start control of the leakage diagnosis based on the temperature or pressure condition in the second embodiment.

To be specific, at the time when the standby time calculated at the operation stop time of the internal combustion engine has elapsed, it is judged whether or not the temperature or pressure condition at the time satisfies a condition where the leakage diagnosis can be started. Then, if the temperature or pressure condition satisfies a condition where the leakage diagnosis can be permitted, the leakage diagnosis is started immediately. On the other hand, in the case where the temperature or pressure condition at the time when the standby time has elapsed shows that the fuel evaporation has not yet been finished, the standby time is made to be longer or the diagnosis is cancelled.

According to the above constitution, during the standby time, the temperature or pressure condition does not need to be monitored so that the power consumption of control unit 20 can be lowered, and on the other hand, it is judged whether or not the leakage diagnosis can be started, based on the temperature or pressure condition. Therefore, it is possible to judge with high accuracy the finish of the fuel evaporation, to start the leakage diagnosis.

The entire contents of Japanese Patent Application No. 2003-356893 filed on Oct. 16, 2003, a priority of which is claimed, are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined in the appended claims and their equivalents.

What is claimed is:

1. A diagnosis apparatus for a fuel vapor purge system which traps the fuel vapor generated in a fuel tank to a canister, to purge the fuel vapor trapped to said canister to an intake passage of an internal combustion engine, comprising:

a pressure generator forcibly changing a pressure in a shielded purge passage inclusive of said fuel tank;

a pressure detector detecting the pressure in said purge passage; and a diagnosis device forcibly changing the pressure in said purge passage by said pressure generator and also receiving a detection signal from said pressure detector, to diagnose whether or not the leakage occurs in said purge passage, wherein said diagnosis device starts the diagnosis processing from a standby period that has elapsed after an operation of said internal combustion engine was stopped, and wherein said diagnosis device calculates a standby time defining the standby period when said internal combustion engine has been stopped, and starts said diagnosis processing from said standby time that has elapsed after the operation of said internal combustion engine was stopped.

2. A diagnosis apparatus for a fuel vapor purge system according to claim 1, further comprising:

a fuel temperature detector detecting a fuel temperature in said fuel tank, wherein said diagnosis device calculates said standby time based on the fuel temperature detected by said fuel temperature detector.

3. A diagnosis apparatus for a fuel vapor purge system according to claim 1, further comprising:

a fuel temperature estimator estimating a fuel temperature in said fuel tank, wherein said diagnosis device calculates said standby time based on the fuel temperature estimated by said fuel temperature estimator.

4. A diagnosis apparatus for a fuel vapor purge system according to claim 1, further comprising:

a fuel property detector detecting a fuel property in said fuel tank, wherein said diagnosis device calculates said standby time based on the fuel property detected by said fuel property detector.

5. A diagnosis apparatus for a fuel vapor purge system according to claim 1, further comprising:

a fuel level detector detecting a fuel level in said fuel tank, wherein said diagnosis device calculates said standby time based on the fuel level detected by said fuel level detector.

6. A diagnosis apparatus for a fuel vapor purge system according to claim 1, further comprising:

an environmental condition detector detecting environmental conditions of said internal combustion engine, wherein said diagnosis device calculates said standby time based on the environmental conditions of said internal combustion engine detected by said environmental condition detector.

7. A diagnosis apparatus for a fuel vapor purge system according to claim 1, wherein said diagnosis device calculates said standby time based on the pressure detected by said pressure detector.

8. A diagnosis apparatus for a fuel vapor purge system which traps the fuel vapor generated in a fuel tank to a canister, to purge the fuel vapor trapped to said canister to an intake passage of an internal combustion engine, comprising:

a pressure generator forcibly changing a pressure in a shielded purge passage inclusive of said fuel tank:

a pressure detector detecting the pressure in said purge passage;

a diagnosis device forcibly changing the pressure in said purge passage by said pressure generator and also receiving a detection signal from said pressure detector, to diagnose whether or not the leakage occurs in said purge passage; and a diagnosis start condition detector detecting a diagnosis start condition, wherein said diagnosis device starts the diagnosis processing from a standby period that has elapsed after an operation of said internal combustion engine was stopped, wherein said diagnosis device sets a period until said diagnosis start condition is detected after the operation of said internal combustion engine has been stopped, as said standby period, and wherein said diagnosis start condition detector:

includes an environmental temperature detector detecting an environmental temperature of fuel, and detects that said environmental temperature becomes lower than a threshold after the operation of said internal combustion engine has been stopped, as said diagnosis start condition.

9. A diagnosis apparatus for a fuel vapor purge system which traps the fuel vapor generated in a fuel tank to a canister, to purge the fuel vapor trapped to said canister to an intake passage of an internal combustion engine, comprising:

a pressure generator forcibly changing a pressure in a shielded purge passage inclusive of said fuel tank;

a pressure detector detecting the pressure in said purge passage;

a diagnosis device forcibly changing the pressure in said purge passage by said pressure generator and also receiving a detection signal from said pressure detector, to diagnose whether or not the leakage occurs in said purge passage; and a diagnosis start condition detector detecting a diagnosis start condition, wherein said diagnosis device starts the diagnosis processing from a standby period that has elapsed after an operation of said internal combustion engine was stopped, wherein said diagnosis device sets a period until said diagnosis start condition is detected after the operation of said internal combustion engine has been stopped, as said standby period, and wherein said diagnosis start condition detector:

includes a fuel temperature detector detecting a fuel temperature in said fuel tank, and detects that said fuel temperature becomes lower than a threshold after the operation of said internal combustion engine has been stopped, as said diagnosis start condition.

10. A diagnosis apparatus for a fuel vapor purge system which traps the fuel vapor generated in a fuel tank to a canister, to purge the fuel vapor trapped to said canister to an intake passage of an internal combustion engine, comprising:

a pressure generator forcibly changing a pressure in a shielded purge passage inclusive of said fuel tank;

a pressure detector detecting the pressure in said purge passage;

a diagnosis device forcibly changing the pressure in said purge passage by said pressure generator and also receiving a detection signal from said pressure detector, to diagnose whether or not the leakage occurs in said purge passage; and a diagnosis start condition detector detecting a diagnosis start condition.

wherein said diagnosis device starts the diagnosis processing from a standby period that has elapsed after an operation of said internal combustion engine was stopped, wherein said diagnosis device sets a period until said diagnosis start condition is detected after the operation of said internal combustion engine has been stopped, as said standby period, and wherein said diagnosis start condition detector detects that the pressure detected by said pressure detector becomes lower than a threshold after the operation of said internal combustion engine has been stopped, as said diagnosis start condition.

11. A diagnosis method for a fuel vapor purge system which traps the fuel vapor generated in a fuel tank to a canister, to purge the fuel vapor trapped to said canister to an intake passage of an internal combustion engine, comprising the steps of:

judging whether or not a standby period has elapsed after an operation of said internal combustion engine was stopped;

forcibly changing a pressure in a shielded purge passage inclusive of said fuel tank after said standby period has elapsed;

detecting the pressure in said purge passage;

diagnosing whether or not the leakage occurs in said purge passage, based on the detected pressure; and calculating a standby time defining said standby period, by:

detecting a fuel temperature in said fuel tank, and calculating said standby time based on the detected fuel temperature.

12. A diagnosis method for a fuel vapor purge system which traps the fuel vapor generated in a fuel tank to a canister, to purge the fuel vapor trapped to said canister to an intake passage of an internal combustion engine, comprising the steps of:

judging whether or not a standby period has elapsed after an operation of said internal combustion engine was stopped;

forcibly changing a pressure in a shielded purge passage inclusive of said fuel tank after said standby period has elapsed;

detecting the pressure in said purge passage;

diagnosing whether or not the leakage occurs in said purge passage, based on the detected pressure; and calculating a standby time defining said standby period, by:

estimating a fuel temperature in said fuel tank; and calculating said standby time based on the estimated fuel temperature.

13. A diagnosis method for a fuel vapor purge system which traps the fuel vapor generated in a fuel tank to a canister, to purge the fuel vapor trapped to said canister to an intake passage of an internal combustion engine, comprising the steps of:

judging whether or not a standby period has elapsed after an operation of said internal combustion engine was stopped;

forcibly changing a pressure in a shielded purge passage inclusive of said fuel tank after said standby period has elapsed;

detecting the pressure in said purge passage;

diagnosing whether or not the leakage occurs in said purge passage, based on the detected pressure; and calculating a standby time defining said standby period, by:

detecting a fuel property in said fuel tank; and calculating said standby time based on the detected fuel property.

14. A diagnosis method for a fuel vapor purge system which traps the fuel vapor generated in a fuel tank to a canister, to purge the fuel vapor trapped to said canister to an intake passage of an internal combustion engine, comprising the steps of:

judging whether or not a standby period has elapsed after an operation of said internal combustion engine was stopped;

forcibly changing a pressure in a shielded purge passage inclusive of said fuel tank after said standby period has elapsed;

detecting the pressure in said purge passage;

diagnosing whether or not the leakage occurs in said purge passage, based on the detected pressure; and calculating a standby time defining said standby period, by:

detecting a fuel level in said fuel tank; and calculating said standby time based on the detected fuel level.

15. A diagnosis method for a fuel vapor purge system which traps the fuel vapor generated in a fuel tank to a canister, to purge the fuel vapor trapped to said canister to an intake passage of an internal combustion engine, comprising the steps of:

judging whether or not a standby period has elapsed after an operation of said internal combustion engine was stopped;

forcibly changing a pressure in a shielded purge passage inclusive of said fuel tank after said standby period has elapsed;

detecting the pressure in said purge passage;

diagnosing whether or not the leakage occurs in said purge passage, based on the detected pressure; and calculating a standby time defining said standby period, by:

detecting environmental conditions of said internal combustion engine; and calculating said standby time based on the detected environmental conditions.

16. A diagnosis method for a fuel vapor purge system which traps the fuel vapor generated in a fuel tank to a canister, to purge the fuel vapor trapped to said canister to an intake passage of an internal combustion engine, comprising the steps of:

judging whether or not a standby period has elapsed after an operation of said internal combustion engine was stopped;

forcibly changing a pressure in a shielded purge passage inclusive of said fuel tank after said standby period has elapsed;

detecting the pressure in said purge passage;

diagnosing whether or not the leakage occurs in said purge passage, based on the detected pressure; and calculating a standby time defining said standby period, by:

detecting the pressure in said purge passage; and calculating said standby time based on the detected pressure.

17. A diagnosis method for a fuel vapor purge system which traps the fuel vapor generated in a fuel tank to a canister, to purge the fuel vapor trapped to said canister to an intake passage of an internal combustion engine, comprising the steps of:

judging whether or not a standby period has elapsed after an operation of said internal combustion engine was stopped;

forcibly changing a pressure in a shielded purge passage inclusive of said fuel tank after said standby period has elapsed;

detecting the pressure in said purge passage; and diagnosing whether or not the leakage occurs in said purge passage, based on the detected pressure, wherein said step of judging whether or not the standby period has elapsed comprises the steps of:

detecting a diagnosis start condition; and judging that said standby period has elapsed, at the time when said diagnosis start condition is detected after the operation of said internal combustion engine has been stopped, and wherein said step of detecting the diagnosis start condition comprises the steps of:

detecting an environmental temperature of fuel; and judging whether or not said environmental temperature becomes lower than a threshold after the operation of said internal combustion engine has been stopped.

18. A diagnosis method for a fuel vapor purge system which traps the fuel vapor generated in a fuel tank to a canister, to purge the fuel vapor trapped to said canister to an intake passage of an internal combustion engine, comprising the steps of:

judging whether or not a standby period has elapsed after an operation of said internal combustion engine was stopped;

forcibly changing a pressure in a shielded purge passage inclusive of said fuel tank after said standby period has elapsed;

detecting the pressure in said purge passage; and diagnosing whether or not the leakage occurs in said purge passage, based on the detected pressure, wherein said step of judging whether or not the standby period has elapsed comprises the steps of:

detecting a diagnosis start condition; and judging that said standby period has elapsed, at the time when said diagnosis start condition is detected after the operation of said internal combustion engine has been stopped, and wherein said step of detecting the diagnosis start condition comprises the steps of:

detecting a fuel temperature in said fuel tank; and judging whether or not said fuel temperature becomes lower than a threshold after the operation of said internal combustion engine has been stopped.

19. A diagnosis method for a fuel vapor purge system which traps the fuel vapor generated in a fuel tank to a canister, to purge the fuel vapor trapped to said canister to an intake passage of an internal combustion engine, comprising the steps of:

judging whether or not a standby period has elapsed after an operation of said internal combustion engine was stopped;

forcibly changing a pressure in a shielded purge passage inclusive of said fuel tank after said standby period has elapsed;

detecting the pressure in said purge passage; and diagnosing whether or not the leakage occurs in said purge passage, based on the detected pressure, wherein said step of judging whether or not the standby period has elapsed comprises the steps of:

detecting a diagnosis start condition; and judging that said standby period has elapsed, at the time when said diagnosis start condition is detected after the operation of said internal combustion engine has been stopped, and wherein said step of detecting the diagnosis start condition comprises the steps of:

detecting the pressure in said purge passage; and judging whether or not said pressure becomes lower than a threshold after the operation of said internal combustion engine has been stopped.

* * * * *